United States Patent
Kurata

(10) Patent No.: US 11,341,413 B2
(45) Date of Patent: May 24, 2022

(54) LEVERAGING CLASS INFORMATION TO INITIALIZE A NEURAL NETWORK LANGUAGE MODEL

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 785 days.

(21) Appl. No.: 15/249,872

(22) Filed: Aug. 29, 2016

(65) Prior Publication Data

US 2018/0060730 A1 Mar. 1, 2018

(51) Int. Cl.
| | |
|---|---|
| *G06N 3/08* | (2006.01) |
| *G10L 15/16* | (2006.01) |
| *G10L 15/197* | (2013.01) |
| *G06N 3/04* | (2006.01) |
| *G06F 40/289* | (2020.01) |

(52) U.S. Cl.
CPC ........... *G06N 3/084* (2013.01); *G06F 40/289* (2020.01); *G06N 3/0454* (2013.01); *G06N 3/0472* (2013.01); *G10L 15/16* (2013.01); *G10L 15/197* (2013.01)

(58) Field of Classification Search
CPC  G06N 3/08; G06N 3/04; G06N 3/084; G06N 3/0454; G10L 15/16
See application file for complete search history.

(56) References Cited

U.S. PATENT DOCUMENTS

| | | | | |
|---|---|---|---|---|
| 2014/0236578 A1* | 8/2014 | Malon et al. | ........... | G06F 17/28 |
| 2017/0154033 A1* | 6/2017 | Lee | ........................ | G06F 17/276 |

OTHER PUBLICATIONS

Brown et al., "Class-Based n-gram Models of Natural Language," Computational Linguistics, vol. 18, No. 4, pp. 467-479, 1992 (Year: 1992).*
Socher et al., "Semi-Supervised Recursive Autoencoders for Predicting Sentiment Distributions," Proceedings of the 2011 Conference on Empirical Methods in Natural Language Processing, pp. 151-161, 2011 (Year: 2011).*
Li et al., "Max-Margin Zero-Shot Learning for Multi-class Classification," Proceedings of the 18th International Conference on Artificial Intelligence and Statistics (AISTATS), 2015 (Year: 2015).*
Yao et al., "Recurrent Neural Networks for Language Understanding," Interspeech 2013, Aug. 25-29, 2013, Lyon, France, pp. 2524-2528 (Year: 2013).*

(Continued)

*Primary Examiner* — Ann J Lo
*Assistant Examiner* — Scott R Gardner
(74) *Attorney, Agent, or Firm* — Tutunjian & Bitetto, P.C.; Randall Bluestone

(57) ABSTRACT

Methods and systems for language processing includes initializing a word embedding matrix based on pre-determined word classes, such that matrix entries associated with a class of which a word is a member are initialized to a non-zero value and other entries are initialized to zero. A neural network is trained based on the initialized word embedding matrix to generate a neural network language model. A language processing task is performed using the neural network language model.

19 Claims, 8 Drawing Sheets

(56) References Cited

OTHER PUBLICATIONS

Luan et al., "Efficient learning for spoken language understanding tasks with word embedding based pre-training," Interspeech 2015, Mitsubishi Electric Research Laboratories TR2015-097 (Year: 2015).*
Bai et al., "A Sentiment Analysis Method for Facial Expression Generation in Human-Robot Interactive Communication," 2014 International Conference on Virtual Reality and Visualization (Year: 2014).*
Tomas Mikolov et al., Distributed Representations of Words and Phrases and their Compositionality, Computation and Language (cs.CL); Learning (cs.LG); Machine Learning (stat.ML), (Oct. 2013).
Yoshua Bengio et al., A Neural Probabilistic Language Model, Journal of Machine Learning Research 3 (Feb. 2003) 1137-1155.
Mitchell P. Marcus, Building a Large Annotated Corpus of English: The Penn Treebank, University of Pennsylvania, Scholarly Commons, Department of Computer and Information Science Technical Report No. MS-CIS-93-87, (Oct. 1993).
Xavier Glorot et al., Understanding the difficulty of training deep feedforward neural networks, In Proceedings of the International Conference on Artificial Intelligence and Statistics (AISTATS'10). Society for Artificial Intelligence and Statistics, (May 2010).
Peter F. Brown, Class-Based n-gram Models of Natural Language, Computational Linguistics, vol. 18 Issue 4, Dec. 1992.

* cited by examiner

| | | | | | | | | | | | | | | |
|---|---|---|---|---|---|---|---|---|---|---|---|---|---|---|
| 0 | 0 | 0 | 0 | 0 | K | 0 | 0 | ... | 0 | 0 | 0 | ? | ... | ? |
| 0 | 0 | 0 | 0 | 0 | 0 | 0 | 0 | ... | 0 | 0 | 0 | ? | ... | ? |
| 0 | K | 0 | 0 | 0 | 0 | 0 | 0 | ... | 0 | 0 | 0 | ? | ... | ? |
| 0 | 0 | 0 | K | 0 | 0 | 0 | 0 | ... | 0 | 0 | 0 | ? | ... | ? |
| 0 | 0 | K | 0 | 0 | 0 | 0 | 0 | ... | 0 | 0 | 0 | ? | ... | ? |
| 0 | 0 | 0 | 0 | K | 0 | 0 | 0 | ... | 0 | 0 | 0 | ? | ... | ? |
| 0 | 0 | 0 | 0 | 0 | 0 | 0 | K | ... | 0 | 0 | 0 | ? | ... | ? |
| 0 | 0 | 0 | 0 | 0 | 0 | 0 | 0 | ... | K | 0 | 0 | ? | ... | ? |
| 0 | 0 | 0 | 0 | 0 | 0 | 0 | 0 | ... | 0 | 0 | K | ? | ... | ? |
| K | 0 | 0 | 0 | 0 | 0 | 0 | 0 | ... | 0 | 0 | 0 | ? | ... | ? |
| 0 | 0 | 0 | 0 | 0 | 0 | K | 0 | ... | 0 | 0 | 0 | ? | ... | ? |
| 0 | 0 | 0 | 0 | 0 | 0 | 0 | 0 | ... | 0 | 0 | 0 | ? | ... | ? |
| ... | ... | ... | ... | ... | ... | ... | ... | ... | ... | ... | ... | ... | ... | ... |
| 0 | 0 | 0 | 0 | 0 | 0 | 0 | 0 | ... | 0 | 0 | 0 | ? | ... | ? |
| 0 | 0 | 0 | 0 | 0 | 0 | 0 | 0 | ... | 0 | 0 | 0 | ? | ... | ? |
| 0 | 0 | 0 | 0 | 0 | 0 | 0 | 0 | ... | 0 | 0 | K | ? | ... | ? |

FIG. 4

| 0 | 0 | 0 | 0 | ... | K | 0 | 0 | ... | 0 | 0 | 0 | ? | ... | ? |
|---|---|---|---|---|---|---|---|---|---|---|---|---|---|---|
| 0 | 0 | 0 | 0 | ... | 0 | 0 | 0 | ... | 0 | 0 | 0 | ? | ... | ? |
| 0 | K | 0 | 0 | ... | 0 | 0 | 0 | ... | 0 | K | 0 | ? | ... | ? |
| 0 | 0 | 0 | K | ... | 0 | 0 | 0 | ... | 0 | 0 | 0 | ? | ... | ? |
| 0 | 0 | K | 0 | ... | 0 | 0 | 0 | ... | 0 | 0 | 0 | ? | ... | ? |
| 0 | 0 | 0 | 0 | ... | 0 | 0 | 0 | ... | 0 | 0 | 0 | ? | ... | ? |
| 0 | 0 | 0 | 0 | ... | 0 | 0 | K | ... | 0 | 0 | 0 | ? | ... | ? |
| 0 | 0 | 0 | 0 | ... | 0 | 0 | 0 | ... | K | 0 | 0 | ? | ... | ? |
| 0 | 0 | K | 0 | ... | 0 | 0 | 0 | ... | 0 | 0 | K | ? | ... | ? |
| K | 0 | 0 | 0 | ... | 0 | 0 | 0 | ... | 0 | 0 | 0 | ? | ... | ? |
| 0 | 0 | 0 | 0 | ... | 0 | K | 0 | ... | 0 | 0 | 0 | ? | ... | ? |
| 0 | 0 | 0 | 0 | ... | 0 | 0 | 0 | ... | 0 | 0 | 0 | ? | ... | ? |
| ... | ... | ... | ... | ... | ... | ... | ... | ... | ... | ... | ... | ... | ... | ... |
| 0 | 0 | 0 | 0 | ... | 0 | 0 | 0 | ... | 0 | 0 | 0 | ? | ... | ? |
| 0 | 0 | 0 | 0 | ... | 0 | 0 | 0 | ... | 0 | 0 | 0 | ? | ... | ? |
| K | 0 | 0 | 0 | ... | 0 | 0 | 0 | ... | 0 | 0 | K | ? | ... | ? |

FIG. 6

LEVERAGING CLASS INFORMATION TO INITIALIZE A NEURAL NETWORK LANGUAGE MODEL

BACKGROUND

Technical Field

The present invention generally relates to neural network language models and, more particularly, to an initialization scheme for neural network language models that leverages pre-estimated or pre-defined class information.

Description of the Related Art

Neural network based language models (NNLMs) calculate probabilities of word sequences in continuous space. Most existing NNLMs convert one-hot representations of word context into continuous representations known as word embeddings. The word embeddings and other parameters are usually randomly initialized and jointly trained in the training of the NNLM.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

SUMMARY

A method for language processing includes initializing a word embedding matrix based on pre-determined word classes, such that matrix entries associated with a class of which a word is a member are initialized to a non-zero value and other entries are initialized to zero. A neural network is trained based on the initialized word embedding matrix to generate a neural network language model. A language processing task is performed using the neural network language model. These and other features and advantages will become apparent from the following detailed description of illustrative embodiments thereof, which is to be read in connection with the accompanying drawings.

A method for language processing includes determining a first set of classes using a first classification method to use as predetermined word classes. A word embedding matrix is initialized based on the pre-determined word classes, such that matrix entries associated with a class of which a word is a member are initialized to a non-zero value, such that matrix entries associated with word classes of which the word is not a member are initialized to zero, and such that matrix entries not associated with a word class are randomly initialized. A dimensionality of the word embedding matrix is reduced if the dimensionality is greater than a maximum size of a neural network. The neural network is trained based on the initialized word embedding matrix to generate a neural network language model. A language processing task is performed using the neural network language model.

A system for language processing includes an initializing module configured to initialize a word embedding matrix based on pre-determined word classes, such that matrix entries associated with a class of which a word is a member are initialized to a non-zero value and other entries are initialized to zero. A training module is configured to train a neural network based on the initialized word embedding matrix to generate a neural network language model. A language processing module is configured to perform a language processing task using the neural network language model.

BRIEF DESCRIPTION OF THE DRAWINGS

The disclosure will provide details in the following description of preferred embodiments with reference to the following figures wherein:

FIG. 4 is a diagram of a word embedding matrix with a single set of word classes in accordance with the present embodiments;

FIG. 6 is a diagram of a word embedding matrix with multiple sets of word classes in accordance with the present embodiments;

DETAILED DESCRIPTION

Embodiments of the present invention employ word embeddings in neural network language models (NNLMs) and initialize the word embeddings using known word class information. This initialization establishes word class relationships that endure through subsequent training of the neural network and that strengthen the resulting classifiers. If a given word belongs to a particular class, a corresponding value of the word and the class in a word embedding matrix is initialized with a constant value, while other class entries for the word are initialized to zero.

Figure 1:
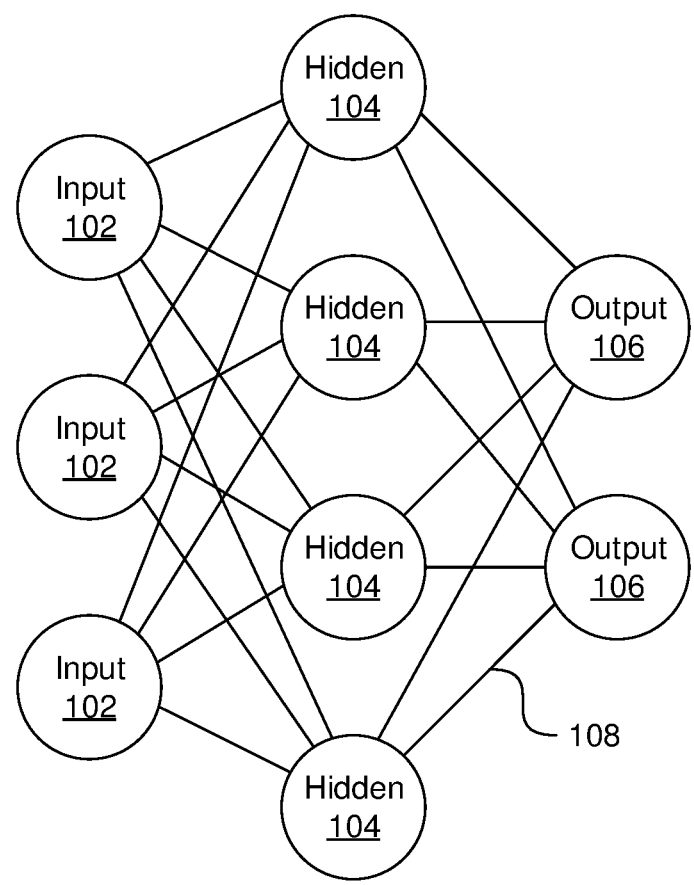
FIG. 1 is a diagram of a neural network.
Figure 2:
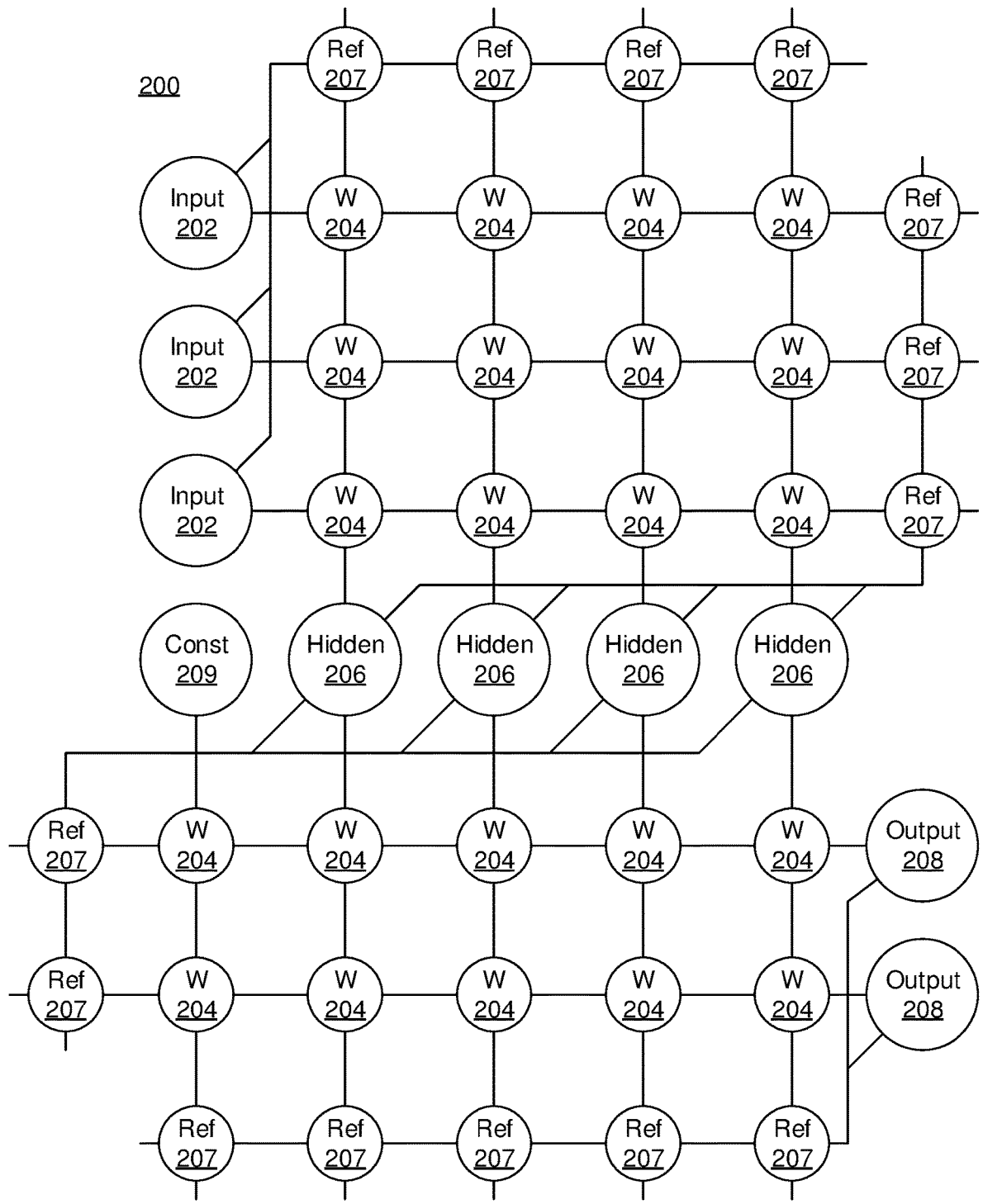
FIG. 2 is a detailed diagram of an exemplary neural network in accordance with the present embodiments.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $I=V/r$, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
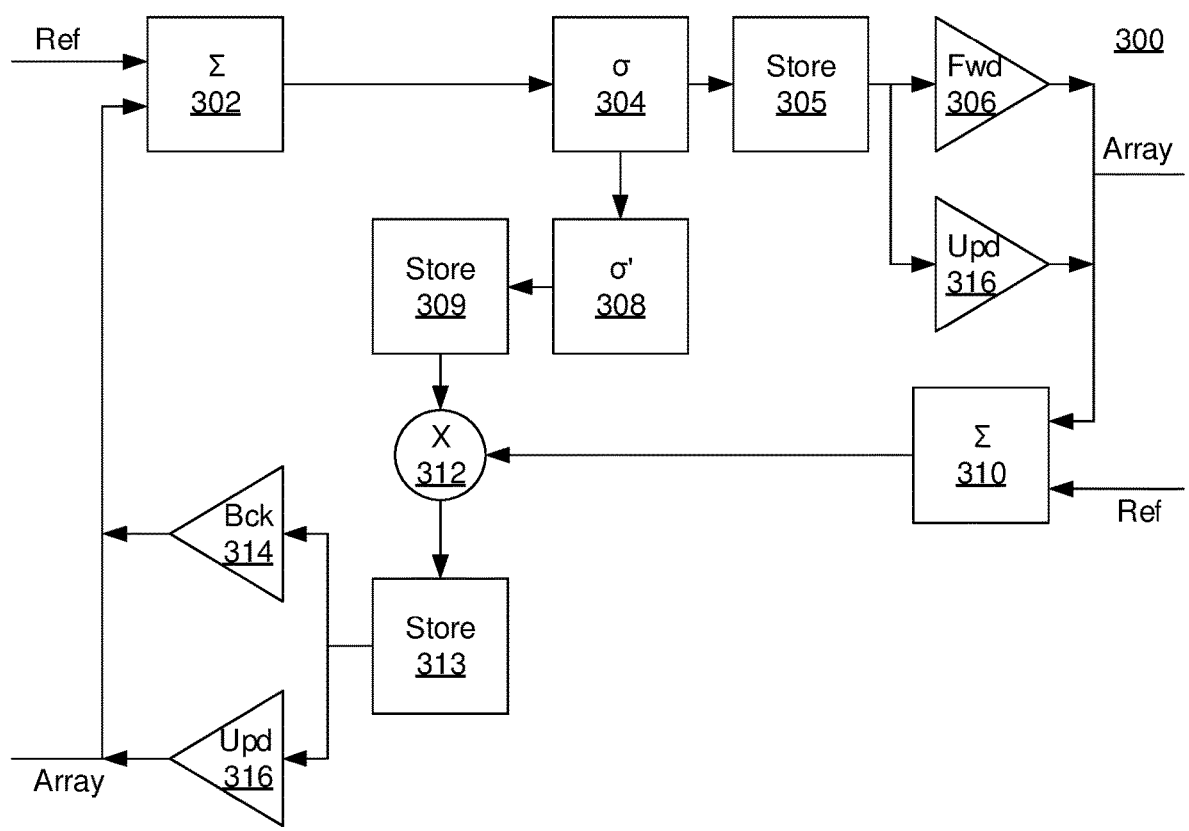
FIG. 3 is a block schematic of read and update circuitry for an exemplary neural network in accordance with the present embodiments.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In one particular embodiment, the weights 204 may be implemented in software or in hardware, using relatively complicated weighting circuitry or using resistive cross point devices. Such resistive devices may have switching characteristics that have a non-linearity that can be used for processing data. The weights 204 may belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

In the present embodiments, the word embedding matrix characterizes a set of words in a vocabulary with respect to classes for the words. A word embedding is a function that maps words from the vocabulary to vectors that may have high dimensionality. Each word may thus be represented as a vector that has many dimensions, with the present embodiments representing each class as a column of the word embedding matrix. In one embodiment, the values of the entries in the word embedding matrix may be real numbers in a continuous space. In contrast to conventional approaches to learning the word embedding matrix, the present embodiments estimate the class information from a training corpus first and then initialize the word embedding matrix with that class information. The word embedding matrix is represented in the neural network as an array of weights. The NNLM is then trained using back propagation.

Referring now to FIG. 4, an exemplary word embedding matrix 400 is shown. The matrix 400 has rows 406 that represent the V words in the vocabulary, with each row representing a different word. The first set of columns 402 of the matrix 400 represent a set of C classes. Each word is assigned to a single class (referred to herein as a "member class"), with the value of the associated entry being set to a constant K. A second set of columns 404 are not associated with any class and are randomly initialized. The total dimension of the word embeddings is then D, with the second set of columns having a dimension D-C. It should be noted that the second set of columns 404 is not always needed, but the provision of additional dimensions usually results in better convergence.

Figure 5:
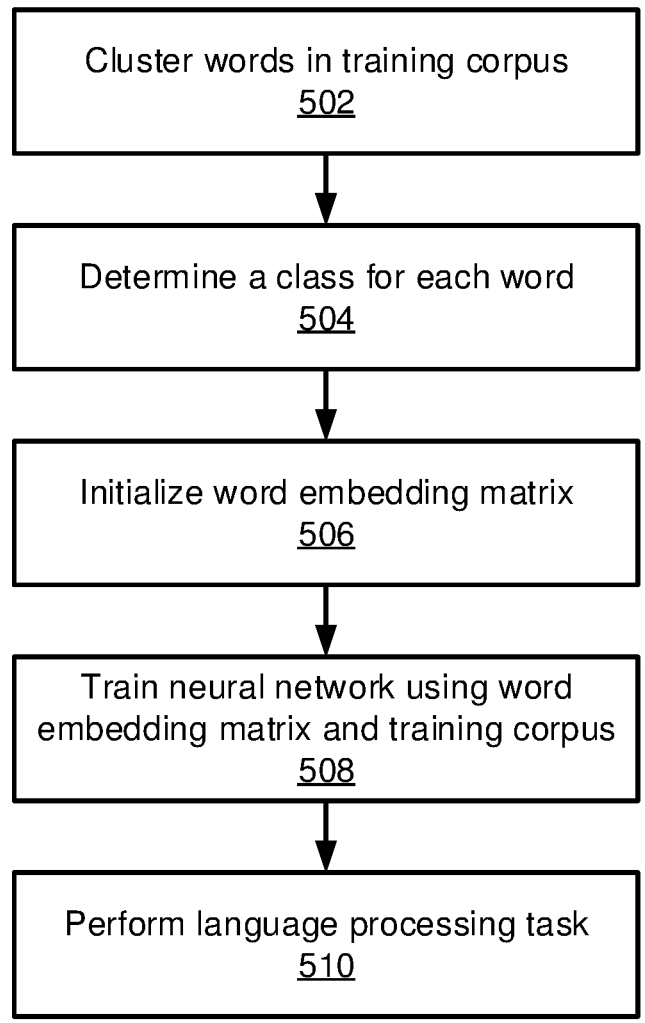
FIG. 5 is a block/flow diagram of a method for performing a language processing task in accordance with the present embodiments.

Referring now to FIG. 5, a method for performing a language processing task is shown. Block 502 clusters the words in a training corpus according to an objective function. Block 502 may employ, for example, Brown clustering, to group the words of the training corpus into clusters that are semantically related based on their embeddings. In particular, the classing criteria used for Brown clustering maximizes the following mutual information function in the training corpus:

$$MI(c_i, c_j) = P(c_i, c_j) \log_2 \frac{P(c_i, c_j)}{P(c_i, *) P(*, c_j)}$$

where $c_i$ and $c_j$ are class labels and where the function P is derived by replacing words in the training corpus to the corresponding class. P represents frequency-based probabilities, where $P(c_i, c_j) = f(c_i, c_j)/f(*,*)$ and $P(c_i) = f(c_i)/f(*)$, where f is a frequency function.

It should be understood that alternative techniques for clustering the words in the training corpus may be used. For example, a neural network may be employed to perform the clustering, though it should be understood that an objective function should be used in block 502 that is different from an objective function that is later used for training the neural network.

Block 504 determines classes for the words based on the clustering. In the example where Brown clustering is used to cluster the words, each cluster of words represents a different class. Each word is assigned to a single class. It should be understood that the classes need not represent meaningful semantic classifications but are instead groupings of words based on some linguistic property detected during clustering. Block 506 then initializes the word embedding matrix 400, with one entry for each word that corresponds to that word's class is initialized to a constant value K. Any values for additional dimensions in the second set of columns 404 that do not correspond to classes are initialized randomly. The value for K can be determined empirically by selecting an arbitrary initial value, training the model for a portion of a set of training data, and comparing its predictions to training data held in reserve.

Once the word embedding matrix 400 has been initialized, block 508 trains a neural network using the word embedding matrix and the training corpus using, e.g., back-propagation. The result is an NNLM that incorporates whatever class information survived the training process, with unneeded class information being automatically discarded during backpropagation. Block 510 then uses the trained NNLM to perform a language processing task. It should be noted that the present embodiments improve the resulting NNLM without changing the structural relationships between the network layers, such that it may be employed as a drop-in replacement for existing NNLMs.

The language processing task may be any task that makes use of a language model. Language models in general are probability distributions over sequences of words and have utility in a variety of natural language processing tasks. Examples of language processing tasks include speech recognition, machine translation, handwriting recognition, and more.

Referring now to FIG. 6, an alternative embodiment of an initialized word embedding matrix 600 is shown. In this embodiment, two sets of classes 602 and 604 are used, with each of the word rows 608 having an associated value in one of each of the sets of classes. Each word therefore has two values initialized to K, with one being associated with each of the sets of classes. The sets of classes may be obtained using any appropriate method. In one example, the first set of classes 602 may be obtained using Brown clustering while the second set of classes 604 may be obtained using a named-entity list (e.g., a pre-defined list of classes). It should be understood that the values for K for the two sets of classes 602 and 604 may be different from one another. Other approaches to generating classes may be used as appropriate. The remaining dimensions 606 are initialized randomly.

It should be noted that word embeddings may have very high numbers of dimensions (the number of different classes). When multiple sets of classes are used, the number of dimensions increases proportionally. In particular, if the number of classes in the first set of classes 602 is $C_1$, the number of classes in the second set of classes 604 is $C_2$, and the number of classes in the randomly initialized set 606 is $C_3$, then the dimensionality of the word embedding matrix 600 is $D=C_1+C_2+C_3$. The word embedding matrix 600 may have a maximum number of classes that is defined by the topology of the neural network, in which case the number of dimensions needs to be reduced. This can be accomplished using principal component analysis (PCA). PCA transforms the original matrix into a set of variables called principal components that is lower in number than the original dimensionality D. PCA may therefore be used to reduce the dimensionality of the word embedding matrix 600 to one having a size that will fit the neural network topology.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 7:
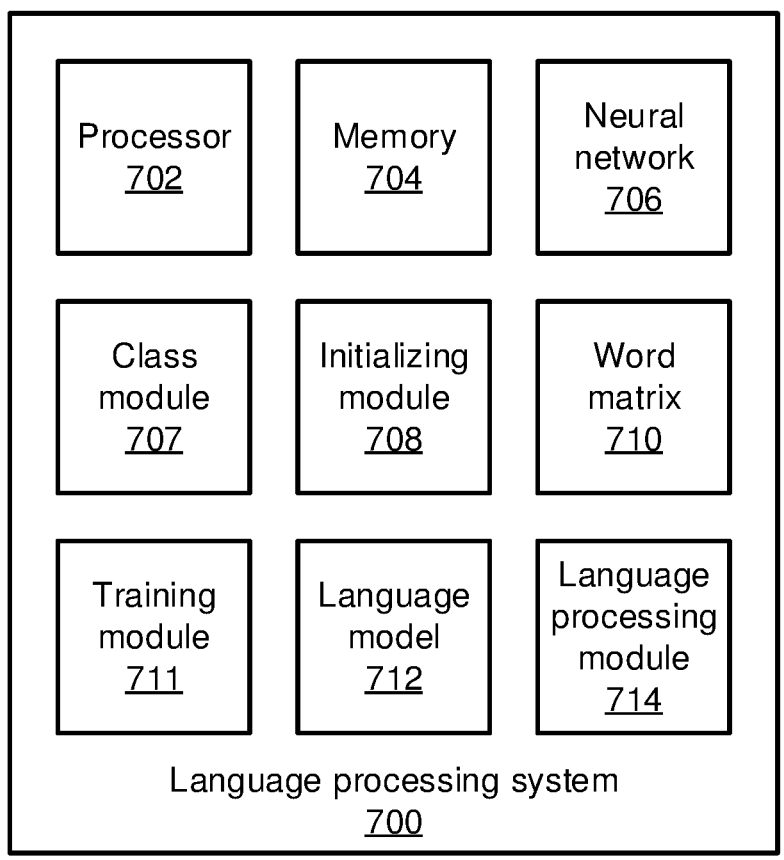
FIG. 7 is a block diagram of a language processing system in accordance with the present embodiments.

Referring now to FIG. 7, a language processing system 700 is shown. The language processing system 700 includes a hardware processor 702 and memory 704. In addition, a neural network 706 is implemented in the system 700. In addition, the system 700 includes one or more hardware modules that may, in one embodiment, be implemented as software that is stored in memory 704 and executed by processor 702. In alternative embodiments, the functional modules may be implemented as one or more discrete hardware components in the form of, e.g., application specific integrated chips or field programmable gate arrays.

A neural network 706 may be implemented in software or may, alternatively, be formed using hardware devices as described in detail above. A class module 707 determines one or more sets of classes for a vocabulary based on a training corpus. The class module 707 may be configured to use any appropriate method for determining the sets of classes including, e.g., Brown clustering. An initializing module 708 sets initial values for a word embedding matrix 710 that is stored in memory 704. As described above, the initializing module 708 uses the sets of classes determined by the class module 707 to initialize specific values of the word embedding matrix 710, where values corresponding to identified classes for a word are set to an initial constant and other values are set to zero.

A training module 711 uses the initialized word embedding matrix 710 and the training corpus to train the neural network 706. The trained neural network 706 produces a language model 712 that can be used for any appropriate language processing task. A language processing module 714 uses the language model 712 to perform the language processing task.

Figure 8:
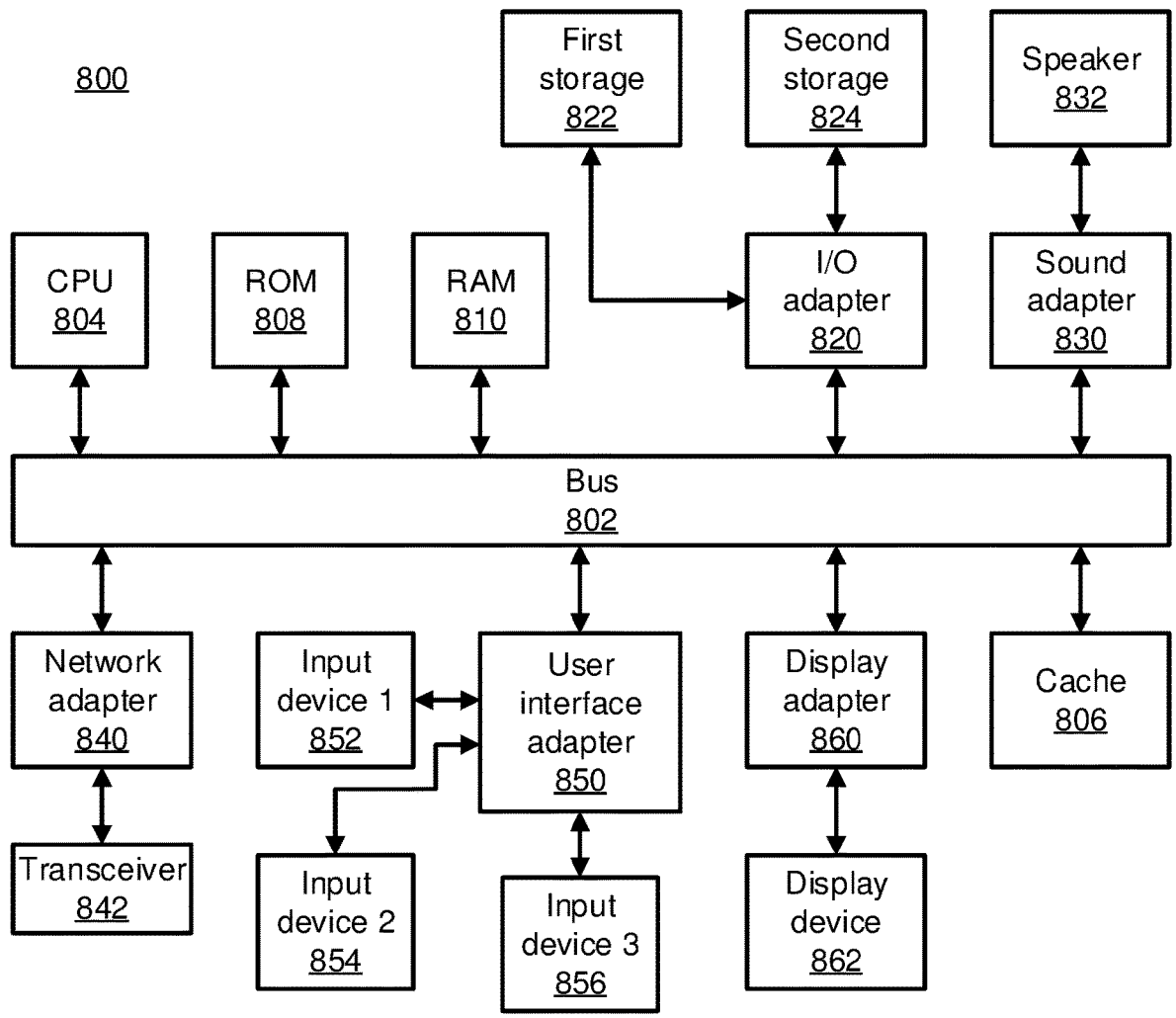
FIG. 8 is a block diagram of a processing system in accordance with the present embodiments.

Referring now to FIG. 8, an exemplary processing system 800 is shown which may represent the transmitting device 100 or the receiving device 120. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Having described preferred embodiments of leveraging class information to initialize a neural network language model (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for language processing, comprising:
empirically determining a non-zero value for initializing entries, based on training data in a neural network model, by selecting an arbitrary initialization value and training the neural network model for a portion of a set of training data, then comparing predictions of the neural network model to training data held in reserve;
initializing a first portion of a word embedding matrix, which is associated with pre-determined word classes based on word clustering, such that matrix entries associated with a class of which a word is a member are initialized to the non-zero value and other entries are initialized to zero;
initializing a second portion of the word embedding matrix, which is not associated with the pre-determined word classes, with random values;
initializing weights in the neural network model using the word embedding matrix;
training the neural network based on a training corpus; and
performing a language processing task using the neural network language model.

2. The method of claim 1, further comprising determining a first set of classes using a first classification method to use as the pre-determined word classes.

3. The method of claim 2, wherein determining the first set of classes comprises performing Brown clustering on the training corpus.

4. The method of claim 2, wherein determining the first set of classes comprises providing a named entity list.

5. The method of claim 2, further comprising determining a second set of classes using a second classification method that is different from the first classification method, said first and second sets of classes being used together as the pre-determined word classes.

6. The method of claim 5, wherein initializing the word embedding matrix comprises initializing one entry for each word for the first set of classes and one entry for each word for the second set of classes to the non-zero value.

7. The method of claim 1, further comprising reducing a dimensionality of the word embedding matrix if the dimensionality is greater than a maximum size of the neural network.

8. The method of claim 7, wherein reducing the dimensionality of the word embedding matrix is performed using principal component analysis.

9. The method of claim 1, wherein the first portion of the word embedding matrix includes a first set of columns and the second portion of the word embedding matrix includes a distinct second set of columns.

10. A non-transitory computer readable storage medium comprising a computer readable program for language processing, wherein the computer readable program when executed on a computer causes the computer to perform the steps of:
empirically determining a non-zero value for initializing entries based on training data in a neural network model, by selecting an arbitrary initialization value and training a neural network model for a portion of a set of training data, then comparing predictions of the neural network model to training data held in reserve;
initializing a first portion of a word embedding matrix, which is associated with pre-determined word classes based on word clustering, such that matrix entries associated with a class of which a word is a member are initialized to the non-zero value and other entries are initialized to zero;
initializing a second portion of the word embedding matrix, which is not associated with the pre-determined word classes, with random values;
initializing weights in a neural network model using the word embedding matrix;
training the neural network based on a training corpus; and
performing a language processing task using the neural network language model.

11. A system for language processing, comprising:
an initializing module configured to empirically determine a non-zero value for initializing entries based on training data in a neural network model, by selecting an arbitrary initialization value and training the neural network model for a portion of a set of training data, then comparing predictions of the neural network model to training data held in reserve, to initialize a first portion of a word embedding matrix, which is associated with pre-determined word classes based on word clustering, such that matrix entries associated with a class of which a word is a member are initialized to the non-zero value and other entries are initialized to zero, and to initialize a second portion of the word embedding matrix, which is not associated with the pre-determined word classes, with random values, and to initialize weights in a neural network model using the word embedding matrix;
a training module configured to train the neural network based on a training corpus; and
a language processing module configured to perform a language processing task using the neural network language model.

12. The system of claim 11, further comprising a class module configured to determine a first set of classes using a first classification method to use as the pre-determined word classes.

13. The system of claim 12, wherein the class module is further configured to perform Brown clustering on the training corpus.

14. The system of claim 12, wherein the class module is further configured to provide a named entity list.

15. The system of claim 12, wherein the class module is further configured to determine a second set of classes using a second classification method that is different from the first classification method, said first and second sets of classes being used together as the pre-determined word classes.

16. The system of claim 15, wherein the initializing module is further configured to initialize one entry for each word for the first set of classes and one entry for each word for the second set of classes to the non-zero value.

17. The system of claim 11, wherein the initializing module is further configured to reduce a dimensionality of the word embedding matrix if the dimensionality is greater than a maximum size of the neural network.

18. The system of claim 17, wherein the initializing module is further configured to reduce the dimensionality of the word embedding matrix using principal component analysis.

19. The system of claim 11, wherein the first portion of the word embedding matrix includes a first set of columns and the second portion of the word embedding matrix includes a distinct second set of columns.

* * * * *